Feb. 25, 1958
I. J. ABRAMS ET AL
2,824,374
PORTABLE MULTIPLYING MEASURING TAPE
Filed June 6, 1956
2 Sheets-Sheet 1
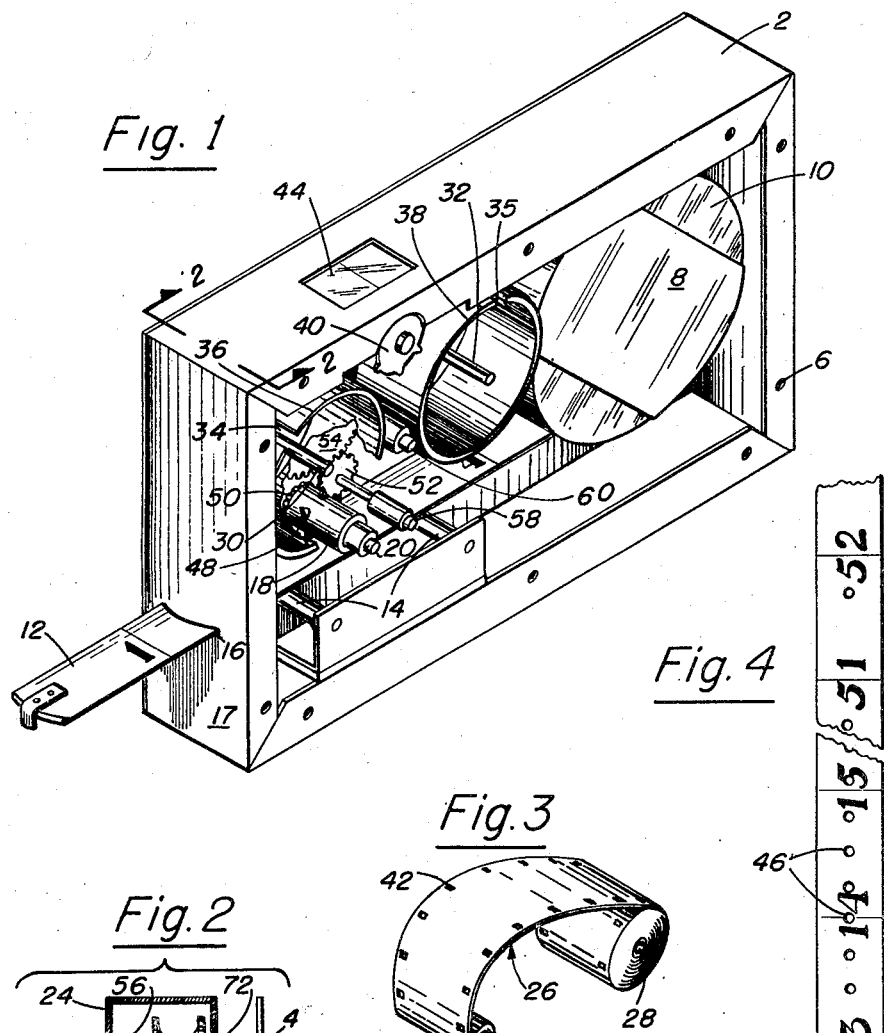
Fig. 1
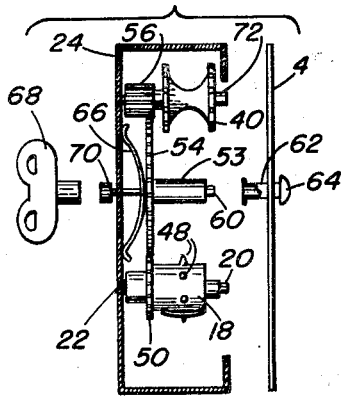
Fig. 2
Fig. 3
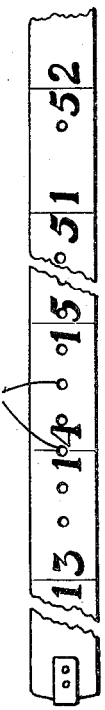
Fig. 4
INVENTORS
Israel J. Abrams
Harry M. Hughes
Leonard Krauss
BY
ATTORNEYS Feb. 25, 1958   I. J. ABRAMS ET AL   2,824,374
PORTABLE MULTIPLYING MEASURING TAPE
Filed June 6, 1956   2 Sheets-Sheet 2
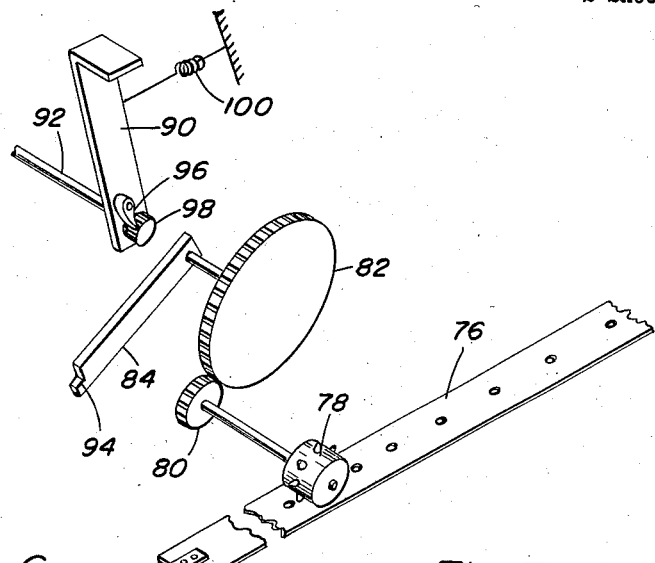
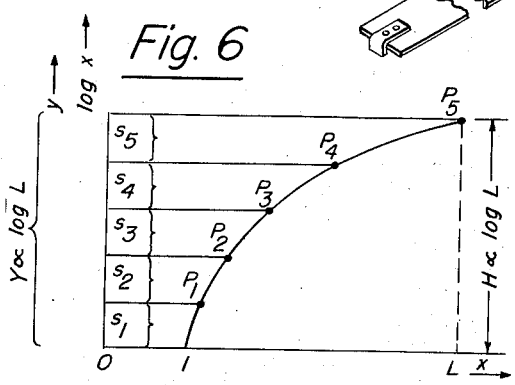
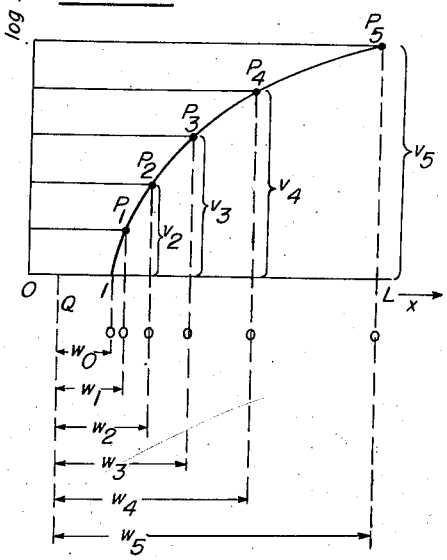
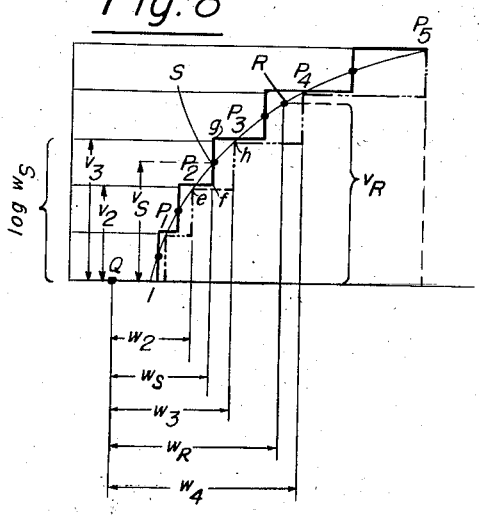
INVENTORS
Israel J. Abrams
Harry M. Hughes
Leonard Krauss
BY
ATTORNEYS 2,824,374
Patented Feb. 25, 1958

2,824,374
PORTABLE MULTIPLYING MEASURING TAPE

Israel J. Abrams, Berkeley, Calif., Harry M. Hughes, San Antonio, Tex., and Leonard Krauss, San Francisco, Calif., assignors, by mesne assignments, to the United States of America as represented by the Secretary of the Navy Application June 6, 1956, Serial No. 589,833

5 Claims. (Cl. 33—140)

This invention relates to measuring tapes and more particularly to multiplying measuring tapes.

Prior art methods for obtaining the product of a plurality of measured lengths, for example in obtaining the volume of a rectangular parallelepiped, such as a box, involved either multiplying by hand, so to speak, the several measured lengths, which was time-consuming and subject to error, or using complicated and expensive equipment for sensing the lengths and mechanically or electrically computing the product.

A principal object of the present invention is to provide a multiplying tape which more or less automatically yields the product of the several lengths measured by it and which is simple to build and use, inexpensive, and conveniently small in size.

Other objects and many of the attendant advantages of this invention will be readily appreciated as the same becomes better understood by reference to the following detailed description when considered in connection with the accompanying drawing wherein:

Fig. 1 is an isometric view of a preferred embodiment of the invention shown with the cover removed;

Fig. 2 is a cross-section of the embodiment of Fig. 1 taken along the line 2—2 of Fig. 1 with certain parts omitted for clarity;

Fig. 3 is an isometric view of the answer scale of Fig. 1;

Fig. 4 is a top view of a portion of the measuring tape of Fig. 1 showing some of the punched holes in it;

Fig. 5 is a more or less schematic illustration of another preferred embodiment of the invention; and Figs. 6, 7 and 8 are graphs showing progressively the mathematical development used in the construction of the tape of Figs. 1 and 5.

The essential principle of the invention involves an apparatus in which a measuring tape is pulled out from its case to measure a given length, an answer scale is moved a distance proportional to the logarithm of the given length and with each succeeding measurement of a length the answer scale is moved a further distance corresponding to the logarithm of that succeeding length whereby the total movement of the answer scale is proportional to the sum of the logarithms of the several measured lengths and hence represents the product of the measured lengths. When the answer scale is calibrated in antilogarithms, it thus reads directly the product of the lengths. One preferred embodiment of the invention using the principle is illustrated in Fig. 1. It comprises an ordinary steel measuring tape in a case. This tape is punched with a series of holes spaced according to a logarithmic law. As the steel tape is pulled out of its case the holes each engage sequentially a tooth of a toothed pickup sprocket. As each hole goes by the sprocket it engages a tooth and turns the sprocket through a certain increment of angle. Since the sprocket teeth are equally spaced, the total angle turned by the sprocket is proportional to the total number of holes which have passed by which, in turn, is proportional to the log of the length of tape pulled out. The sprocket, by means of intermediate gears, moves an answer device, conveniently an answer tape, and the distance moved by the answer tape is thus also proportional to the log of the length of measuring tape extended. After the process has been repeated, the final reading of the answer tape represents the product of the several measurements.

Reference is now made to Figs. 1 through 4 of the drawing. In the preferred embodiment shown in these figures the numeral 2 indicates a housing for the multiplying tape mechanism generally in the form of a box which can be of a size convenient to be easily carried in one hand. The housing 2 is provided with a cover 4 (not shown in Fig. 1) allowing easy access to the mechanism and held on by any convenient means such as screws engaging holes 6. Within the housing is fixed, by any convenient means such as a metal strap 8, a spool or casing of measuring tape 10. This measuring tape can be conveniently of the conventional type in which the tape proper 12, made of steel, will remain at any position to which it is pulled out but will easily feed back into its casing. The tape 12 feeds out of its case 10 and runs over roller guides 14 and out through a slot 16 in the face 17 of the housing 2. It lies in contact with the lowermost two teeth of a pickup sprocket 18 against which it is held by pressure of rollers 14. Sprocket 18 is formed with stub shaft portions 20 and 22 having bearing relation in the cover 4 and wall 24 of the box 2, respectively. An answer device is provided in the form of an answer tape 26 which can be of plastic or the like similar to motion picture film. Each end of the answer tape is preferably fastened to a metal sleeve 28. The answer tape, shown separately in Fig. 3 for clarity, is normally positioned with one sleeve 28 mounted on the spindle 30 and the other sleeve 28 mounted on the spindle 32. The spindles 30 and 32 are fixedly mounted on the wall 24 of the housing 2. The answer tape 26 feeds out of slots 34 and 35 in drums 36 and 38, respectively, and passes over the teeth of a feed sprocket 40 which engage appropriate holes 42 in the tape. Passing over the sprocket, the indicia on the answer tape are visible through a window 44, having a reference mark.

The motion of the measuring tape 12 is transmitted in a modified form to the answer tape 26 through an intermediate mechanism comprising holes 46 in the measuring tape which engage teeth 48 of pickup sprocket 18, pinion 50 fixed to rotate as a unit with sprocket 18, idler gear 52, displaceable gear 54, and pinion 56 unitary with feed sprocket 40. The shaft of idler gear 52 is provided with stub shaft portions 58 at either end which are journaled in the wall 24 of housing 2 and in the cover 4. The shaft 53 of displaceable gear 54 is journaled at one end in wall 24 and at the other end with stub shaft portion 60 in sleeve bearing 62 longitudinally displaceable in cover 4 by means of button 64. The displaceable gear 54 is maintained in the position shown in Fig. 2 by spring 66 bearing against the interior of wall 24. A key 68 is provided for rewinding the answer tape by engagement with a mating portion 70 fixed on the end of shaft 53. The assembly of feed sprocket 40 is journaled in wall 24 and with stub shaft 72 in cover 4.

In brief, the operation of the preferred embodiment of Fig. 1 can be understood from the following as applied to determining the volume of an ordinary box. The measuring tape 12 is pulled out in the usual manner to the exact length of an unknown-sized box. As the tape issues from the housing 2 the holes 46 in it engage the teeth 48 of the sprocket 18 and cause the pickup sprocket 18 to rotate in stepped motion. Through gears 50, 52 and 54 and feed sprocket 40, the motion of the measuring tape 12 is transmitted to the answer tape 26 and because of the particular spacing of the holes 46 this latter moves a distance approximately proportional to the log of the length of the measuring tape extended. When pulling out the measuring tape 12 to measure the length of the unknown-sized box, it does not matter if the mark is overshot in the process because the aforedescribed mechanism is capable of transmitting motion bi-directionally from the measuring tape 12 to the answer tape 26. That is, as the measuring tape 12 is pulled out of the housing the answer tape 26 moves concomitantly forward whereas when the measuring tape 12 is pushed into the housing the answer tape 26 moves concomitantly backward so that at any instant the indication on the answer tape is a measure of the logarithm of the displacement of the measuring tape from its zero position. After the measuring tape 12 has been extended to measure the length of the unknown-sized box, the button 64 acting on the big spur gear 54 is pushed to disengage the big gear 54 from the small gear 52 on the sprocket shaft 18. With the gear 54 disengaged, the measuring tape is pushed back into the case, thus leaving the answer tape still at a displacement corresponding to the length of the unknown-sized box. The measuring process is then repeated for the height and width of the unknown box and the final total displacement of the answer tape will then correspond to the sum of the logs of the three dimensions of the unknown box.

The answer tape is calibrated like the scales of a Mannheim slide rule to read in antilogs of its displacement. Since by the foregoing manipulation the answer tape has been displaced an amount corresponding to the sum of the logs of the three dimensions of the box, the answer tape will read through the window 44 the volume of the box since it reads Antilog ($\log l + \log h + \log w$)

which $= l \times h \times w =$ volume of box. After the volume of the unknown box has been read, the mechanism must be re-set before its next use. To do this the button 64 is pushed in to disengage gear 54 from idler gear 52 and the key 68 is used to drive the answer tape backward so that it coils most of itself within drum 38 and reads zero through window 44. The answer tape is resilient so that it easily coils itself within the drums 36 and 38 much as the steel measuring tape coils itself in its case. During this resetting operation the gear 54 remains, of course, in engagement with the wide pinion 56 while it remains out of engagement with the relatively thin idler gear 52 so that there is no tendency to drive the measuring tape.

A detailed explanation of how the Fig. 1 preferred embodiment of the multiplying tape is constructed and operates is as follows. The steel measuring tape 12 is pulled out in the usual manner to span exactly a length, $x$, of a box to be measured. As the measuring tape moves out of its container to measure length $x$, it causes to move the answer scale 26 (which may be a dial or other indicator but preferably as shown, is an indicating tape) an amount $y$ which is approximately proportional to $\log x$. That is, when the measuring tape 12 is extended to a distance $x$, a fixed fiducial mark is pointing to a position on the answer scale located at a distance $c \log x$ from the zero point of the answer scale, where $c$ is some convenient constant. This correlative motion of the answer scale is accomplished, in the preferred embodiment, by punching holes 46 along the length of the measuring tape spaced according to a law hereinafter explained, and causing the tape, as it is pulled out of its container, to pass by and in contact with the teeth 48 of the toothed wheel 18 in such a manner that as each hole in the tape passes the wheel it engages for a brief moment that tooth of the wheel which is immediately adjacent the tape and thus turns the wheel through a predetermined increment of angle until, by so doing, the hole disengages itself from the tooth. The teeth of the wheel are uniformly spaced around the wheel and are of uniform length so that when any hole engages and drags any tooth the wheel is turned through the same increment of angle. The wheel is connected by the intermediate gears to move the answer scale 26 a distance proportional to the angle through which the wheel turns.

From the foregoing it should be clear that the total angle $\theta$ turned by the toothed wheel 18, and hence the distance $y$ moved by the answer scale 26, is proportional to the number $n$ of holes passing by the wheel as the measuring tape is pulled out. Thus:

$$y \propto \theta \propto n$$

or $$y = na$$

where "$a$" is a convenient constant. In order to fulfill the previously mentioned desideratum that $$y = c \log x$$

it must be arranged so that $$y = na$$

and $$y = c \log x$$

or that $$na = c \log x$$

from which $$n = \frac{c}{a} \log x$$

which says that the number of holes punched in the length $x$ of the measuring tape must be proportional to the logarithm of $x$.

To determine how to space the holes, consider the following. When the total length, $L$, of the measuring tape 12 is pulled out, the total number, $N$, of holes has passed under the wheel 18. Reference is now made to Fig. 6, which is made with greatly exaggerated proportions for illustration. If the length $L$ appears on the abscissa, then the height $H \propto \log L$ since the curve is an exponential. That is $H \propto \log L$ as written to the right in Fig. 6. Also, as previously mentioned, $y$, the distance travelled by the answer scale 26 as the length of the measuring tape 12 is extended, is proportional to $\log x$, where $x$ is the amount of measuring tape pulled out or $$y \propto \log x$$

or $$y = c \log x$$

The ordinate thus (1) is proportional to the log of the length of measuring tape extended, (2) is proportional to the movement of the answer scale and (3), since the answer scale movement is by uniform steps occasioned by the passage of each hole engaging a tooth, is proportional to the number of holes extended, with the constant of proportionality being the ratio "$a$" which is the movement of the answer scale per predetermined angular increment of toothed wheel movement as each tooth goes by. Thus it can be written that $$N \propto \log L$$

and $$H \propto \log L$$

and $$Y \propto \log L$$

where $Y$ is the total movement of the answer scale corresponding to the extending of length $L$ of the measuring tape and, further, that $Y$ is divided into a series of uniformly spaced steps and that this number of steps corresponds to $N$ because, as previously noted, the answer scale 26 is constrained to move in a series of uniform steps by each hole in the measuring tape 12 engaging and dragging a tooth as that hole passes by the toothed wheel. The distance $y$ can also be conveniently represented on Fig. 6 along the ordinate axis.

Setting $N$ arbitrarily equal to 5 for illustration only, the distance $Y$ is then divided into 5 equal steps, $s_1$, $s_2$, $s_3$, $s_4$, $s_5$. This means that the answer scale will be moved successively distances equal to the ordinates of points $P_1$, $P_2$, $P_3$, $P_4$, and $P_5$ as each of the corresponding holes in the measuring tape engages and moves a tooth on the toothed wheel 18. Since each step movement of the answer scale 26 corresponds to the passage of a hole in the measuring tape 12 by the toothed wheel 18, the holes must lie on the measuring tape in positions corresponding to points $P_1$, $P_2$, $P_3$, $P_4$, $P_5$, i. e. equal to the respective abscissae of these points along the length L. The locations of these points are thus found by dropping perpendiculars from the points toward the $x$ axis, as shown in Fig. 7. The arrangement of the holes can be easily visualized from the series of small circles below the $x$ axis in this figure.

Now it will be observed that $$v_5 = \log w_5 = \log L$$

or $$\log w_5 = \log L \quad (1)$$

Similarly $$\log w_4 = v_4 = 4/5 \log L \quad (2)$$
$$\log w_3 = v_3 = 3/5 \log L \quad (3)$$
$$\log w_2 = v_2 = 2/5 \log L \quad (4)$$

etc.

Since any base may be chosen for logs, choose L as the base for simplicity. Then (1), (2), (3), and (4) can be re-written thus:

$$\log_L w_5 = \log_L L = 1 \quad (5)$$
$$\log_L w_4 = 4/5 \quad (6)$$
$$\log_L w_3 = 3/5 \quad (7)$$
$$\log_L w_2 = 2/5 \quad (8)$$

etc.

Taking antilogs:

$$w_5 = L^1 \quad (9)$$
$$w_4 = L^{4/5} \quad (10)$$
$$w_3 = L^{3/5} \quad (11)$$
$$w_2 = L^{2/5} \quad (12)$$

etc.

It is observed that $$\frac{w_5}{w_4} = \frac{w_4}{w_3} = \frac{w_3}{w_2}, \text{ etc.} = L^{1/5} = \text{constant}$$

That is, the holes are so spaced from each other than the ratio of the distances of any pair of adjacent holes from a fixed point, Q, on the tape is a constant. When the total number of holes in length L is N, instead of 5, this constant is $L^{1/N}$. Then if the distance $w_1$ of the first hole is known, the location for each succeeding hole can be obtained by repeatedly multiplying $w_1$ by $L^{1/N}$, assuming that N is known. It may be mentioned that at this point N is not known but must lie within a certain maximum as determined by the minimum allowable spacing between adjacent holes. The relationship $$\frac{w_n}{w_{n-1}} = \text{constant}$$

is however, useful to calculate the spacing from other considerations. It should be noted that this relation holds even at $w_0$ so that $$\frac{w_1}{w_0} = \frac{w_2}{w_1} = \frac{w_3}{w_2}, \text{ etc.}$$

The closest practical spacing of two adjacent punched holes is determined by the minimum practical spacing of teeth on the toothed wheel. As a first approximation let the closest hole spacing be set at $d \approx 1/8'' = 1/96'$ for an ordinary steel tape.

The zero hole, $w_0$, which is not punched but is important mathematically, is located at $w=1$ unit, e. g. 1 foot on a typical tape. The closest allowable hole spacing being $d$, then $$w_1 = w_0 + d$$
$$w_1 = 1 + d$$

The multiplying factor of the hole spacing then is $$\frac{w_1}{w_0} = \frac{1+d}{1} = 1+d$$

from which $$w_2 = w_1 (1+d)$$
$$= (1+d)(1+d)$$
$$= (1+d)^2$$

In general, then, $w_n = (1+d)^n$ where $n$ varies from zero $\to N$. Note that $n$ does vary from 1N but from $0 \to N$. Actually, because $w_0$ is not punched, $w_1$ can be spaced closer to $w_0$ than the minimum practical spacing between punched holes. Let $d=$ the distance $w_1 - w_0$. Then $$w_0 = 1$$
$$w_1 = 1+d$$
$$w_2 = (1+d)^2$$

$w_2 - w_1 =$ smallest allowable distance between punched holes $=\delta$ $$\delta = (1+d)^2 - (1+d) = 1+2d+d^2-1-d = d^2+d$$

$$d = \frac{-1 \pm \sqrt{1-4(1)(-\delta)}}{2} = -\frac{1}{2} + \frac{\sqrt{1+4\delta}}{2}$$

Assuming $$\delta \approx 1/8''; \quad d = -\frac{1}{2} + \frac{\sqrt{1+4 \times 1/96}}{2} = .010' = .120''$$

whereas $$\delta = 1/8'' = 1/96' = .125''$$

It might be asked why the $w_0$ hole is not punched. This is because the punched hole at any given location on the measuring tape is for the purpose of actuating the toothed wheel answer mechanism to move the answer tape or dial to indicate the logarithm of the distance of the aforementioned "given location" from the fixed reference point Q and since for $w_0$ that "given location" is at 1 unit from Q and the log 1=zero, then zero motion of the answer tape is desired and that is accomplished by not punching the hole. It is observed that the relation among the holes can be expressed in two ways:

(1) $$\frac{w_n+1}{w_n} = (1+d)$$

or (2) $$w_n = (1+d)^n$$

the first stating that the ratio of the distances of two adjacent holes from Q is $(1+d)$ and the second stating that the distances of the series of holes from Q can be expressed as the terms of a power series of the form $(1+d)^n$. In both relations, $n$ starts at 0 and not at 1. Thus the first hole $w_0$ is at $(1+d)^0$ which $=1$ unit from Q.

Since the answer mechanism moves in abrupt steps as the measuring tape is pulled out, the answer mechanism reads erroneously for a large part of the time. That is, ideally, as the measuring tape 12 is pulled out to its total length L laid off along the $x$ axis, the answer tape 26 should also be continuously smoothly moving and should have moved at any given time an amount proportional to the log of the amount of measuring tape extended so that the answer tape would be indicating a value proportional to the ordinate $v_R$, for example, of the smooth curve in Fig. 8 corresponding to the abscissa $w_R$ of any typical point R. Instead, the device actually moves in jumps or steps and the value shown by the answer tape corresponds to the ordinates of the points forming the dash line staircase in Fig. 8. This means, for example, that when the measuring tape extends a distance equal to $w_R > w_3$, the answer tape still has moved a distance proportional to only $\log w_3 < \log w_R$ and hence the measuring tape reads lower than it should. As observed from the position of the dash line staircase relative to the exponential curve (i. e. always below it), the answer tape always reads low except at those few isolated points $P_1$, $P_2$, $P_3$, etc. (i. e.

where it touches the curve), where the holes occur and at which points it reads accurately.

To render the device more nearly accurate it is thought to modify it so that it will read high perhaps about as often as it reads low, with the notion that on the average the errors will compensate among themselves. Consider any typical region on Fig. 8 such, for example, as the region between $P_2$ and $P_3$ as the length of the measuring tape extended increases from $w_2$ to $w_3$. Ideally, the answer tape should simultaneously increase continuously from $v_2$ to $v_3$ (although not at a uniform rate because the graph from $P_2$ to $P_3$ is not a straight line). Actually, when the measuring tape extends to $w_2$ the answer tape reads $v_2$ and continues to read $v_2$, as demonstrated by the horizontality of the dash line passing through point $P_2$, and thus is reading low until the very instant when the measuring tape extends to $w_3$ at which instant the answer tape jumps suddenly to $v_3$ and is again, for this instant, reading accurately. To remedy this, as a first approximation, let the hole formerly punched at $P_3$, which causes the answer tape to read $v_3 = \log w_3$, be moved to the left and be punched at S such that S lies midway on the log curve between $P_2$ and $P_3$, i. e.

$$v_s = \frac{v_2 + v_3}{2}$$

which can also be regarded as $$v_s = v_2 + \tfrac{1}{2}(v_3 - v_2)$$

or as $$v_s = v_3 - \tfrac{1}{2}(v_3 - v_2)$$

With the hole thus punched at S instead of $P_3$ the answer tape will read $v_2$ as the measuring tape extends from $w_2$ to $w_s$, as demonstrated by the horizontal solid line $ef$ extending to right from $P_2$, and thus reads low for this range $P_2 \to S$, except at the very point $P_2$ where it reads accurately. As the measuring tape is pulled out to length $w_s$ the answer tape reading suddenly jumps to $v_3$, as demonstrated by the vertical solid line $fg$ passing through point S. Since the answer tape ideally should read $v_s = \log w_s$ at this point but instead reads $v_3 > v_s$, the answer tape is reading high and continues to do so in the range $S \to P_3$, as demonstrated by the horizontal solid line $gh$, until the measuring tape extends exactly an amount $w_3$ at which point the answer tape again reads accurately. Since $ef$ is below the ideal curve while $gh$ is above it, it is thus seen that the solid line forms a fair approximation of the region of the ideal curve between $P_2$ and $P_3$. It should be noted that the treads, i. e. the horizontal lines, of the dash line staircase should in part actually coincide with the corresponding treads on the solid line staircase but for clarity they are illustrated as slightly separated.

To determine the location, $w_s$, of the point on the measuring tape at which to punch the revised hole, i. e. to determine how to shift the hole from $P_3$ to the left to locate the hole at S, it suffices simply to determine the relation between $w_s$ and $w_3$. This is obtained as follows.

$$w_s = \text{antilog } v_s$$
$$= \text{antilog } \frac{v_2 + v_3}{2}$$

but $$v_2 = \log w_2 = \log (1+d)^2$$

and $$v_3 = \log w_3 = \log (1+d)^3$$

hence $$w_s = \text{antilog } \frac{\log (1+d)^2 + \log (1+d)^3}{2}$$

$$= [(1+d)^2 (1+d)^3]^{1/2}$$

$$w_s = (1+d)^{5/2} = w_3 (1+d)^{-1/2}$$

This means that the new location S for the hole formerly at $P_3$ is at the distance $$w_s = \frac{w_3}{\sqrt{1+d}}$$

meaning that the new distance from Q is the old distance multiplied by $$\frac{1}{\sqrt{1+d}}$$

That this is true in general can be demonstrated by substituting $w_n$ for $w_3$ when $P_n$ will be moved to $P_n'$ as $w_n$ changes to $w_n'$ and $v_n$ changes to $v_n'$.

$$w_n' = \text{antilog } v_n' = \text{antilog } \frac{v_{n-1} + v_n}{2}$$

$$v_{n-1} = \log(1+d)^{n-1} \text{ and } v_n = \log(1+d)^n$$

$$w_n' = \text{antilog } \frac{\log(1+d)^{n-1} + \log(1+d)^n}{2}$$

$$= [(1+d)^{n-1}(1+d)^n]^{1/2}$$

$$w_n' = [(1+d)^{2n-1}]^{1/2} = (1+d)^n (1+d)^{-1/2}$$

The improved series of holes will thus be located at the following distances from Q.

| | Hole No. | Distance |
|---|---|---|
| $P_0'$ | 0 (not punched). | $w_0' = w_0 (1+d)^{-1/2} = (1+d)^{-1/2} = \frac{1}{1+d}$ |
| $P_1'$ | 1 | $w_1' = w_1(1+d)^{-1/2} = (1+d)^1(1+d)^{-1/2} = (1+d)^{1/2}$ |
| $P_2'$ | 2 | $w_2' = w_2(1+d)^{-1/2} = (1+d)^2(1+d)^{-1/2} = (1+d)^{3/2}$ |
| $P_3'$ | 3 | $w_3' = w_3(1+d)^{-1/2} = (1+d)^3(1+d)^{-1/2} = (1+d)^{5/2}$ | etc.

It should be noted that the ratio of successive distances is still $(1+d)$. Punching the holes according to the improved series produces readings of the answer tape which progress according to the solid line staircase. It is seen that the solid line staircase is not obtained by merely shifting the dash line staircase bodily to the left in Fig. 8. While the heights above the floor of the respective risers of the two staircases are identical, the sizes of the respective treads are not in general identical. Said in other words, this means that the location of the solid line risers from Q is not obtained by shifting the respective dash line risers the same fixed distance to the left; instead, the solid line riser distance from Q is found by taking a certain fixed fraction, $$\frac{1}{\sqrt{1+d}}$$

of the distance of the corresponding dash line riser from Q.

To construct an actual model of the device as shown in Fig. 1, choose any convenient size for the sprocket and gears and let $d$ be the minimum practical distance between punched holes as determined by the spacing of sprocket teeth and the type of tape used. With the tape pushed all the way into its case let Q be the point on the measuring tape immediately beneath the lowermost tooth of the sprocket. Then the first hole (which is not punched) is located on the tape at a distance from Q equal to $$\frac{1}{\sqrt{1+d}}$$

The first punched hole is at a distance from Q equal to $(1+d)^{1/2}$ and the remaining holes are spaced from Q at distances $(1+d)^{3/2}$, $(1+d)^{5/2}$, etc.

The markings on the answer tape must range from zero to the cube of the length of the measuring tape. The length of the answer tape will depend on the convenience of fitting it within the case and the ratios of the gears interconnecting the pickup sprocket 18 and the answer tape drive must be chosen appropriately. As previously noted, the markings are similar to those on the C or D scale of a Mannheim slide rule, i. e. the markings are spaced according to the logs of an increasing sequence of numbers but the markings are recorded not as the value of the log but as the value of the number. For example, at the beginning (zero point) of the answer scale there is placed the mark 1 of which the log is zero. When the measuring tape is L feet long and the answer tape (which must read from zero to $L^3$) is T feet long over its markable length, then the formula for marking the answer scale is $z = k \log u$ where z is the distance from the zero point along the answer tape to the marking for u cubic feet and $$k = \frac{T}{3 \log L}$$

In a typical case where $L=6$ feet and $T=42$ inches$=3\frac{1}{2}$ feet, then the following are sample values:

| Mark | Distance | |
|------|----------|---|
| 2.0' | 5.42" | $z = \frac{3.5}{3 \log 6} \log u$ |
| 3.0' | 8.58" | for $u=2'=24"$ |
| 6.0' | 14.00" | $z=1.5 \log 2=1.5 \times .3010$ |
| 7.0' | 15.20" | $z=.45'=(.45 \times 12)"=5.42"$ |

As mentioned previously, the theoretical value of $d$ is actually the minimum distance mechanically acceptable between the first two punched holes, i. e. $w_2 - w_1$ and not $w_1 - w_0$. For the improved series then the theoretically proper value for $d$ in the $(1+d)^n$ series is determined as follows:

$$w_2' - w_1' = \delta$$

where $\delta$=acceptable minimum, say $\frac{1}{8}" = \frac{1}{96}'$ $$(1+d)^{3/2} - (1+d)^{1/2} = \delta$$

squaring both sides, $$(1+d)^3 - 2(1+d)^2 + (1+d) = \delta^2$$
$$d^3 + 3d^2 + 3d + 1 - 2d^2 - 4d - 2 + 1 + d = \delta^2$$
$$d^3 + d^2 = \delta^2$$
$$d^2(1+d) = \delta^2$$

This is a cubic equation and hard to solve classically. As a first approximation solve for $d$ thus $$d^2 = \frac{\delta^2}{1+d} \text{ or } d = \frac{\delta}{\sqrt{1+d}}$$

but $d \approx \delta$ so that $$d = \frac{\delta}{\sqrt{1+\delta}} = \frac{\delta}{(1+\delta)^{1/2}}$$

Expanding by the binomial theorem $(1+\delta)^{1/2}$ and retaining only significant terms $(1+\delta)^{1/2} = 1 + \delta/2$. Substituting $$d = \frac{\delta}{(1+\delta)^{1/2}} = \frac{\delta}{1+\delta/2}$$

Expanding the denominator again by the binomial theorem and neglecting higher order terms since $\delta \ll 1$, we have $$(1+\delta/2)^{-1} \approx (1 - \delta/2)$$

Substituting, $d = \delta(1 - \delta/2)$ from which it is clear that $d \approx \delta$ but is slightly smaller than $\delta$. If $\delta = \frac{1}{8}"$, then the new $d$ of the $(1+d)^n$ series $= (\frac{1}{8} - \frac{1}{128})"$.

Theoretically, the new $(1+d)^n$ series should be written in terms of $\delta$ and would appear as follows:

$$\left(1 + \delta - \frac{\delta^2}{2}\right)^{-1/2, 1/2, 3/2, 5/2, \text{etc.}}$$

However, since this is a much complicated formula and since $d$ is very closely approximately equal to $\delta$, it will be sufficient for all practical purposes to locate the punched holes according to the simpler formula.

For simplicity, the staircases shown in Fig. 8 have been illustrated with vertical risers, implying that the answer device changes instantaneously from $v_n$ to $v_{n \times 1}$. Actually it takes an observable amount of time for the sprocket wheel to move as each tooth is engaged in a hole in the measuring tape. Thus to be theoretically correct, the risers of the staircase should be shown as inclined upward and to the right instead of vertical.

In Fig. 5 is shown a more or less schematic illustration of another preferred embodiment of the invention similar, in general, to the embodiment of Fig. 1 but improved over it in the regard that it does not require returning the measuring tape to zero before each successive measurement of, for example, a length, width, and height of an object as is required in the case of the embodiment of Fig. 1. The principle of operation of the embodiment of Fig. 5 is that the measuring tape is pulled out to measure a given dimension and during this movement causes a concomitant motion of a gaging element. Thereafter a sensing element connected through a one-way clutch to the answer device, which may be a dial indicator or tape indicator or the like, is caused to approach the gaging element and sense its position, the position of the gaging element thus being reflected in the displacement of the answer device. In the schematic form illustrated in Fig. 5 the measuring tape 76 engages the sprocket wheel 78 which, through gears 80 and 82, moves a gaging arm 84 to a position where it, so to speak, "points" to the logarithm of the distance the tape 76 has been extended. A sensing arm 90 mounted for free rotation about the axis of and relative to an accumulator shaft 92 is disposed so as to be rotatable in a counter-clockwise direction as viewed in Fig. 5 to engage the notch 94 in the gaging arm 84 to sense the position of the gaging arm. Through a one-way clutch illustrated as being simply a pawl and ratchet drive 96, 98, the sensing arm drives the accumulator shaft 92. Connected to the accumulator shaft 92, but not shown in the drawing, is any suitable answer device such as a dial indicator or a tape of the type shown in Fig. 1. A spring 100 returns the sensing arm 90 to its zero position.

The operation of the embodiment of Fig. 5 can be easily understood from the recitation of the steps taken in the actual computation of a volume with such an instrument. (1) The tape 76 is drawn out to the first measurement. It does not matter if the mark is overshot in the process and then the tape is adjusted in and out until the exact distance is at the face of the instrument. (2) A lever or other convenient actuator (not shown) is moved by the operator to cause the sensing arm 90 to be moved from its zero position until it engages and is stopped by the notch 94 in gaging element 84. This operation records the first measurement on the answer tape or other answer device by transmitting the motion of the lever 90 through the pawl 96 to the ratchet 98 fixed to the accumulator shaft 92. (3) The lever or actuator is released by the operator permitting the spring 100 to return the arm 90 to its zero position. Because the pawl and ratchet 96 and 98 constitute a one-way clutch, the answer device is unaffected by the returning of the arm 90 to its zero position. (4) The measuring tape 76 is adjusted—in, out, or not at all—to the second measurement. (5) The lever or actuator is pulled by the operator to move the sensing arm 90 to record the second measurement on the answer tape. The appropriate steps are repeated for the third measurement and the answer is read directly in the answer window. (6) The answer scale is reset to zero. The method of doing this depends on the answer system used. Some methods will require disconnecting the answer system momentarily from the arm 90. This could be done by means interposed between the shaft 92 and the answer device or by means for disengaging the pawl 96 from the ratchet 98.

The disconnection can be incorporated into the rewind knob of the answer tape or other answer device so that there would still be only two control devices for the operator—the rewind knob and a lever or other actuator connected to arm 90.

Many modifications of this invention can be made. For example, a spring return can be used for the reset process for returning the answer device to zero. Also the measuring tape can be caused to actuate the mechanism by various means. For example, instead of using a plurality of small holes, the measuring tape can be made with a narrow slot lengthwise along the full length of the tape, broken by "teeth" or cross pieces at logarithmic intervals. If it is preferred to eliminate punched holes or the like in the measuring tape, the conversion of the motion of the measuring tape into a logarithmic movement can be obtained by causing the measuring tape to drive a shaft, such as 18 in Fig. 1, in direct proportion to the motion of the tape (by friction roller drive, or by direct gear drive taken from the winding spool of the measuring tape) but interposing in the gear train leading to the answer device a gear having a logarithmic arrangement of teeth. This gear might be a circular gear with logarithmically spaced teeth, each actuating a more or less conventional pinion as it passes by the pinion. Alternatively, there could be used a logarithmic spiral gear mounted, for example, centrally on the surface of a disc driven about its central axis in linear proportion to the motion of the measuring tape. In this case a relatively wide pickup pinion connected to drive the answer device would be required, this pinion being disposed radially of the disc and of sufficient width to remain always in mesh with the logarithmic spiral gear.

If a spring return is used for the measuring tape 12, the button 64 can be connected so that as it is depressed to disengage gear 54 from pinion 50 it simultaneously pushes the return release button on casing 10 and the tape 12 automatically springs back into casing 10.

To facilitate meshing of the gears 54 and 50 as the gear 54 is urged into meshing position under the action of spring 66, the two opposite edges of the proximate side of each tooth on each of the two gears can be chamfered or filed away so that the proximate side of each tooth on the two gears becomes a knife edge lying along the radial line through the center of that tooth, the sides of a spur gear tooth being designated as the two normally plane surfaces normally parallel to each other and perpendicular to the face of the tooth, and the proximate side being that side which is closer to the other of the pair of meshable gears.

If desired, as a precaution against tearing the answer tape 26 by accidental attempts to drive it beyond its limit, the edge portions near each end of the tape carrying the last few holes 42 can be cut away.

Obviously many other modifications and variations of the present invention are possible in the light of the above teachings. It is, therefore, to be understood that within the scope of the appended claims the invention may be practiced otherwise than as specifically described.

What is claimed is:

1. A device of the character described comprising a measuring tape; a housing for retaining said tape; an answer indicator; means for moving said answer indicator both forward and backward, respectively, in accord with the displacement out and in of said tape relative to said housing an amount generally proportional to the logarithm of the length of tape displaced; and controllable means for disconnecting said last-named means whereby said tape can be displaced relative to said housing without concomitant motion of said answer indicator.

2. The device of claim 1 wherein said tape is provided with a plurality of holes spaced along its length and said first-named means includes a toothed wheel whose teeth are engageable with said holes in said tape whereby said wheel is rotated as said tape is displaced while in engagement with said teeth.

3. The device of claim 2 wherein said answer indicator is calibrated to read in antilogs of its displacement whereby the product of successive measurements taken by said measuring tape can be read directly on said answer indicator.

4. A device of the character described comprising a case; a measuring tape adapted to be rolled up into the case and extended therefrom; said measuring tape having a series of holes punched therein along its length; a sprocket wheel having a plurality of evenly-spaced teeth mounted in said case in such a manner that the teeth of said wheel are adapted to be engaged by said holes in said tape as said tape is displaced relative to said case whereby said sprocket wheel is turned through a predetermined increment of angle as each hole in said tape passes by said sprocket wheel; an answer tape mounted in said case; a drive mechanism including said sprocket wheel whereby said measuring tape drives said answer tape displacing said answer tape an amount proportional to the angular displacement of said sprocket wheel; means for disengaging said drive mechanism whereby said measuring tape can be displaced without transmitting its motion to said answer tape; the holes in said measuring tape being spaced approximately according to the formula $w_n = (1+d)^{n-1/2}$ where $w_n$ is the distance of the $n^{th}$ hole measured from that point of the measuring tape which is directly under a tooth of the sprocket wheel when the measuring tape is fully drawn into the case and where $d$ is approximately equal to the smallest acceptable distance between adjacent punched holes on the measuring tape as determined by the spacing of the teeth on the chosen sprocket wheel; the markings on said answer tape being laid out according to the formula $$z = \frac{T}{3 \log L} u$$

where $z$ is the distance from the zero point on the answer tape to the marking $u$, T being the total markable length of the answer tape, and L being the total length of the measuring tape, T and L being in the same units and $u$ being read in cubic units.

5. A device of the character described comprising a measuring tape; a housing for retaining said tape; an answer indicator; means for moving said answer indicator in accord with the displacement of said tape relative to said housing an amount generally proportional to the logarithm of the length of tape displaced; said means including an element whose motion determines the positioning of said answer indicator drivable by said measuring tape in opposite directions, respectively, in accord with the displacement of said measuring tape out and in relative to said housing for determining the positioning of said answer indicator; and controllable means for disconnecting said aforementioned means whereby said tape can be displaced relative to said housing without concomitant motion of said answer indicator.

References Cited in the file of this patent

UNITED STATES PATENTS

| | | |
|---|---|---|
| 1,560,392 | Mager | Nov. 3, 1925 |
| 1,737,659 | Jellinek et al. | Dec. 3, 1929 |

UNITED STATES PATENT OFFICE

Certificate of Correction

Patent No. 2,824,374

February 25, 1958

Israel J. Abrams et al.

It is hereby certified that error appears in the above numbered patent requiring correction and that the said Letters Patent should read as corrected below.

Column 5, line 45, for "than" read —that—; column 6, line 10, after "does" insert —not—; same line 10, for "1N" read —1→N—; same column 6, between lines 42 and 44, Equation (1) should read as shown below instead of as in the patent—

$$\frac{w_{n+1}}{w_n} = (1+d)$$

column 8, in the table, under the heading "Distance", first line thereof, the last term of the equation should appear as shown below instead of as in the patent—

$$\frac{1}{(1+d)^{\frac{1}{2}}}$$

column 9, in the table between lines 20 to 28, under the heading "Mark", the prime mark (') erroneously indicating number of feet should be deleted from each of the entries in the column; same table, last column, about line 25, for "for $u=2'=24'''$" read —for $u=2$—; same column 9, line 31, for "$w_2-w_1$" read —$w_2-w_1$—; line 74, after "much" insert —more—; column 10, line 5, for "$v_{nx1}$" read —$v_{n+1}$—.

Signed and sealed this 29th day of April 1958.

[SEAL]

Attest:
KARL H. AXLINE,
*Attesting Officer.*

ROBERT C. WATSON,
*Commissioner of Patents.*